United States Patent [19]
Thompson

[11] Patent Number: 5,724,762
[45] Date of Patent: Mar. 10, 1998

[54] FISHING LURE RETRIEVAL DEVICE

[76] Inventor: Jack Thompson, 500 S. 9th, Independence, Kans. 67301

[21] Appl. No.: 680,657

[22] Filed: Jul. 16, 1996

[51] Int. Cl.$^6$ .................................................. A01K 97/24
[52] U.S. Cl. ................................................. 43/17.2; D22/149
[58] Field of Search .......................... 43/17.2, 53.5; D22/149

[56] References Cited

U.S. PATENT DOCUMENTS

| | | | |
|---|---|---|---|
| D. 178,320 | 7/1956 | Franc | D22/149 |
| D. 218,823 | 9/1970 | Richins | D22/149 |
| D. 280,542 | 9/1985 | Hurst | 43/17.2 |
| 1,851,370 | 3/1932 | Munger | 43/17.2 |
| 2,103,008 | 12/1937 | Kinast | 43/53.5 |
| 2,560,723 | 7/1951 | Hansen | 43/17.2 |
| 2,893,157 | 7/1959 | Foley | 49/17.2 |
| 2,948,077 | 8/1960 | Karpes | 43/17.2 |
| 2,968,112 | 1/1961 | McClure | 43/17.2 |
| 2,998,670 | 9/1961 | Edwards | 43/53.5 |
| 3,186,121 | 6/1965 | Jones | 43/17.2 |
| 3,295,243 | 1/1967 | Mohar, Sr. | 43/17.2 |
| 4,171,587 | 10/1979 | Bullen, Jr. | 43/17.2 |
| 4,433,501 | 2/1984 | Maxwell | 43/17.2 |
| 4,622,772 | 11/1986 | Cawley | 43/17.2 |
| 4,712,324 | 12/1987 | Padgett | 43/17.2 |
| 4,947,576 | 8/1990 | Hull et al. | 43/53.5 |
| 5,076,002 | 12/1991 | Kelly | 43/17.2 |
| 5,216,828 | 6/1993 | Langstone | 43/17.2 |

*Primary Examiner*—Joseph J. Hail, III
*Attorney, Agent, or Firm*—Hovey, Williams, Timmons & Collins

[57] ABSTRACT

An improved fishing lure retrieval device (10) is provided which can be used to efficiently unsnag fishing lures (92, 98) of varying sizes from underwater obstructions. The device (10) includes an elongated, telescoping aluminum handle (12) as well as an integral synthetic resin operating head (14). The head (14) includes a pair of separate, differently sized lure-receiving openings (24, 26) therethrough with a pair of separate fishing line-clearing passageways (60, 68) respectively leading to and communicating with a corresponding opening (24, 26). The head (14) also includes a pair of adjacent, elongated segments (34, 36) which cooperatively define a concavity (32); a blade (82) is removably mounted to the body (14) in an orientation for severing of fishing line or other objects passed into the concavity (32).

20 Claims, 3 Drawing Sheets

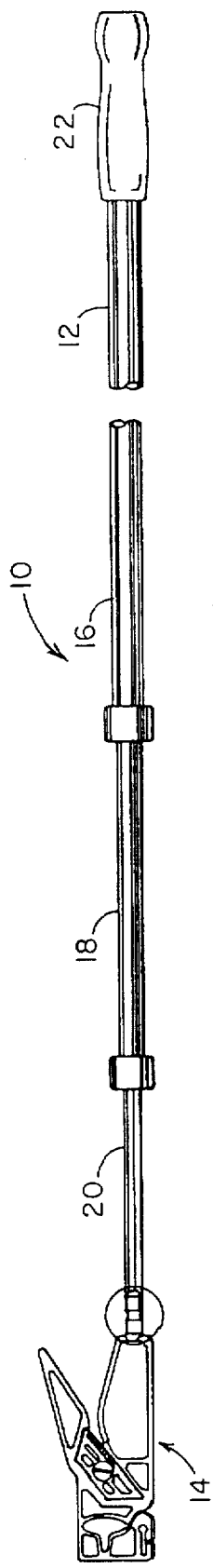
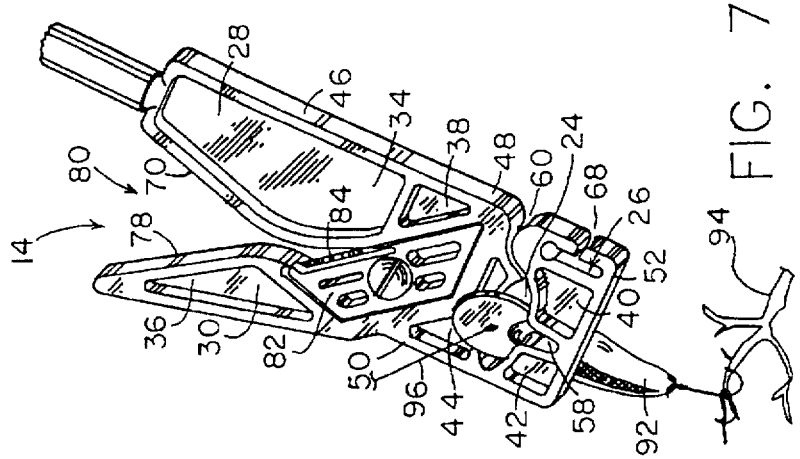
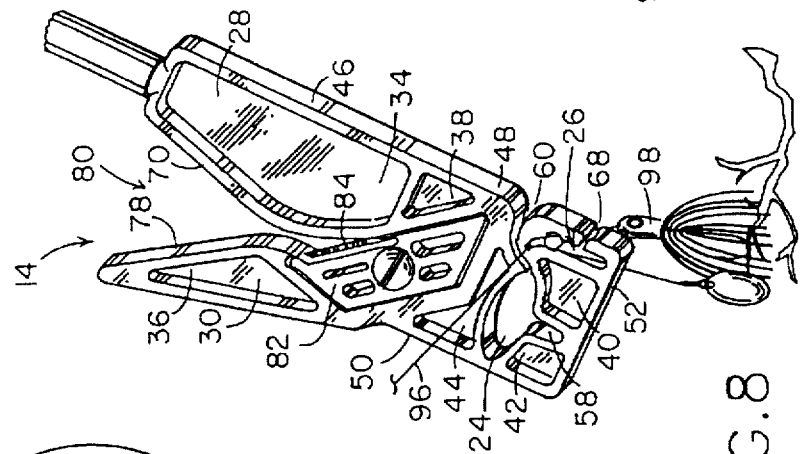
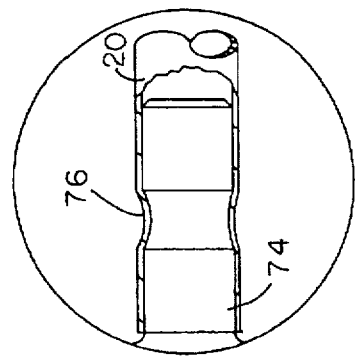
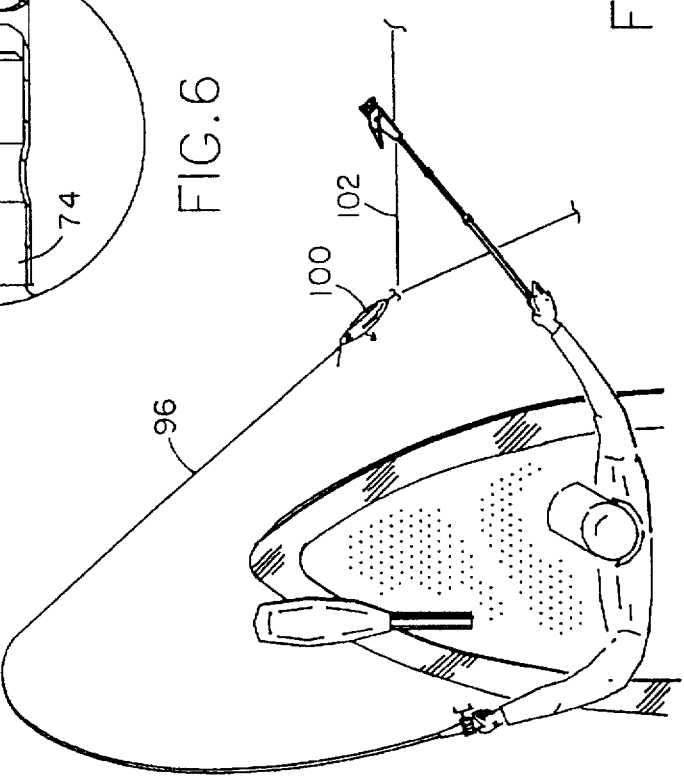

5,724,762

1

FISHING LURE RETRIEVAL DEVICE

BACKGROUND OF THE INVENTION

1. Field of the Invention

The present invention is broadly concerned with improved multi-functional fishing lure retrieval devices which can be used to efficiently retrieve both relatively large lures (e.g., plugs or other crankbaits) and small lures (e.g., jigs) when such lures become ensnared or hooked on obstructions; in addition, the devices of the invention can be used to sever interfering spent fishing line or other small objects. More particularly, the invention pertains to such retrieval devices which include an elongated handle with an operating head mounted thereto, wherein the operating head has a pair of separate, differently sized lure-receiving openings therethrough specifically designed for easy retrieval of the various types of fishing lures commonly in use.

2. Description of the Prior Art

Fishing lures often become snagged or hooked onto underwater objects such as tree trunks, underwater brush or spent fishing line. Many such lures may be expensive or highly prized personal property of the fisherman, and accordingly there is often a strong desire to retrieve such snagged lures. In most cases, the fisherman attempts to unsnag the lure by tightening the fishing line and pulling the fishing pole in various directions. In some cases this is successful, but often the attempt to unsnag a lure in this manner does nothing but worsen the problem by more deeply embedding the lure hooks in the obstruction.

In response to such problems, lure and hook releasing devices have been proposed in the past. See, U.S. Pat. Nos. D280,542, 1,851,370, 2,948,077, 2,968,112, 3,186,121, 4,171,587, 4,433,501, 4,622,772, 4,712,324, 4,947,576, 5,076,002 and 5,216,828. In most cases, these prior devices include an elongated rod or handle with an operating member adjacent one end thereof. The operating member typically is configured to present an opening therethrough adapted to receive a lure. In use, the fisherman attempts to retrieve a lure by passing the operating member over the lure, thus allowing it to be manipulated so as to unsnag it from the obstruction.

A principal problem with prior devices of this type stems from the fact that they are not designed to effectively unsnag the wide variety of fishing lures commonly in use. That is, while a given device may be acceptable for unsnagging relatively large lures, it can be totally useless for removing small lures such as jigs.

It also sometimes occurs that a lure is so deeply snagged that effective removal is impossible, or that the lure ensnares submerged, spent fishing line. In such instances, it is necessary to cut either the fishing line supporting the lure, or the spent line. To this end, it is desirable to include severing means associated with the operating member of the retrieval device, thereby facilitating such line cutting operations.

There is accordingly a need in the art for an improved, multi-functional fishing lure retrieval device which can be used to readily unsnag and free essentially all types of fishing lures.

SUMMARY OF THE INVENTION

The present invention overcomes the problems outlined above and provides an improved fishing lure retrieval device broadly including an elongated handle operatively coupled with a specially configured operating head. The operating head is advantageously in the form of an integral synthetic

2 resin body presenting marginal walls and separate, first and second, differently sized lure-receiving openings therethrough. A pair of separate narrow fishing line-clearing passageways are also provided, with each passageway extending from a marginal wall of the body and communicating with a respective lure-receiving opening. The head body also has a pair of adjacent, elongated, diverging segments cooperatively defining a concavity therebetween, with cutting means mounted on one of the segments for severing of an object such as fishing line received in the concavity. The handle is preferably secured to one of the elongated segments and includes a series of telescopically interfitted handle sections.

The relatively larger and smaller lure-receiving openings are configured and arranged for receiving therein different types of fishing lures, so that essentially all commonly available lures can be effectively retrieved.

BRIEF DESCRIPTION OF THE DRAWINGS

FIG. 5 is a fragmentary side view of the lure retrieval device and illustrating the interconnection between the handle and operating head;

FIG. 6 is an enlarged, fragmentary view depicting in detail the crimp connection between the handle and operating head;

FIG. 7 is an isometric view similar to that of FIG. 1 but depicting use thereof in the retrieval of a relatively large plug-type fishing lure;

FIG. 8 is a view similar to that of FIG. 7 but illustrating use of the device in the retrieval a relatively small lure; and FIG. 9 is a generally schematic plan view illustrating use of the device in cutting of spent fishing line ensnared by the user's fishing lure.

DETAILED DESCRIPTION OF THE PREFERRED EMBODIMENT

Figure 1:
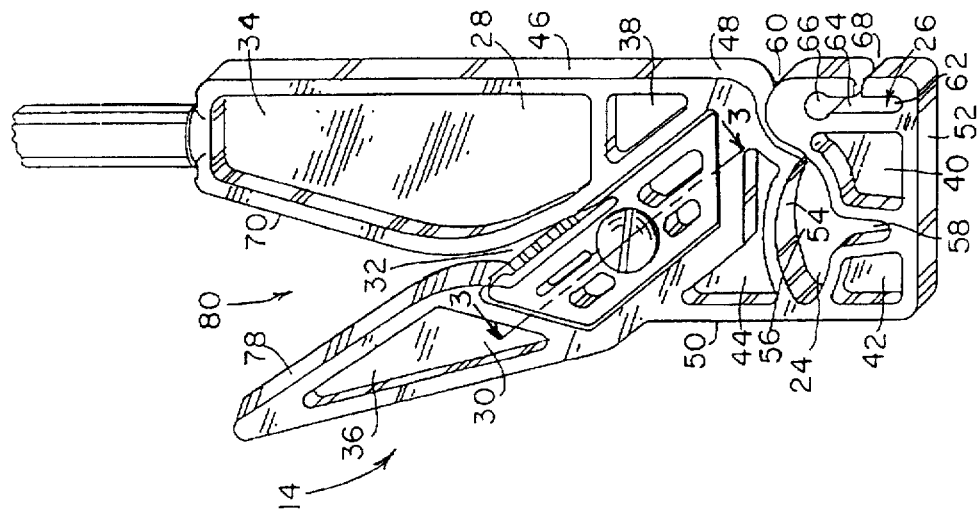
FIG. 1 is a fragmentary isometric view illustrating the operating head of the preferred lure retrieval device of the invention.

Turning now to the drawings and particularly FIGS. 1–4, a fishing lure retrieval device 10 in accordance with the invention broadly includes a aluminum handle 12 with an operating head 14 secured to the latter.

Handle 12 includes a series of telescopically interfitted, selectively extendable and retractable sections 16, 18 and 20, together with an enlarged, endmost grip 22. The end of handle 12 remote from grip 22 is of tubular design (see FIG. 6) and is secured to head 14 in a manner to be described.

The head 14 is in the form of an integral synthetic resin (e.g., nylon) body broadly including first and second lure-receiving openings 24, 26 as well as adjacent, elongated, diverging segments 28, 30 which cooperatively define therebetween a generally V-shaped concavity 32. In more detail, the head 14 has a series of central, generally planar panel segments 34, 36, 38, 40, 42 and 44 together with marginal wall segments 46; the latter are of a thickness which is greater than the thickness of the panel segments 34-44, so that the panel segments are recessed. The marginal wall segments 46 cooperatively define a pair of laterally spaced sidewall surfaces 48, 50 and bottom wall surface 52.

Figure 2:
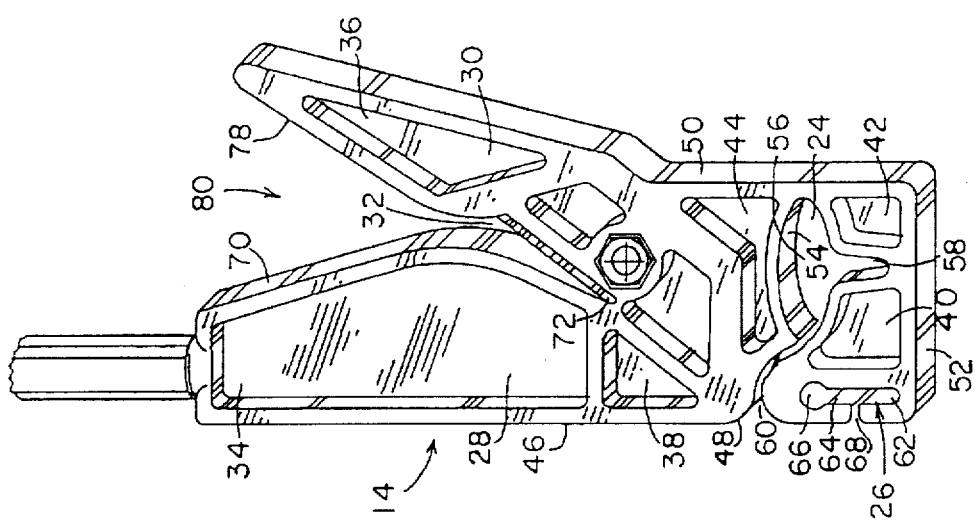
FIG. 2 is a fragmentary isometric view similar to that of FIG. 1 but illustrating the opposite face of the operating head as compared with FIG. 1.

The first opening 24 is defined by arcuate inner walls 54 and presents an elongated, laterally extending primary zone or section 56 and a relatively small secondary section 58. The longitudinal axes of the primary and secondary sections 56, 58 are transverse to each other as best seen in FIGS. 1 and 2. It will also be seen that a first fishing line-clearing passageway 60 extends from and through sidewall surface 48 and communicates with the interior of first opening 24.

The second opening 26 is defined by inner walls 62 presenting an elongated main section 64 and a generally circular in cross-section, enlarged head section 66. The length of elongated section 64 is preferably at least about three times the width thereof as illustrated in FIGS. 1-2. A second fishing line-clearing passageway 68 likewise extends through sidewall surface 48 and communicates with second opening 26.

The first segment 28 includes an inner arcuate sidewall surface 70 which terminates at apex 72. The segment 34 also includes an integral, cylindrical extension 74 (see FIG. 6) which is received within the tubular end of handle section 20. The latter is crimped as at 76 so as to mechanically and frictionally secure the handle 12 to operating head 14.

Figure 3:
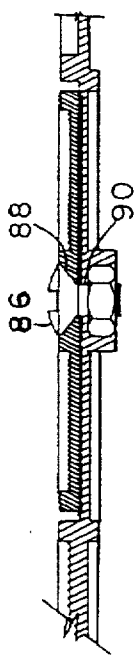
FIG. 3 is a fragmentary vertical sectional view taken along line 3—3 of FIG. 1 and illustrating the removable cutting blade secured to the head.
Figure 4:
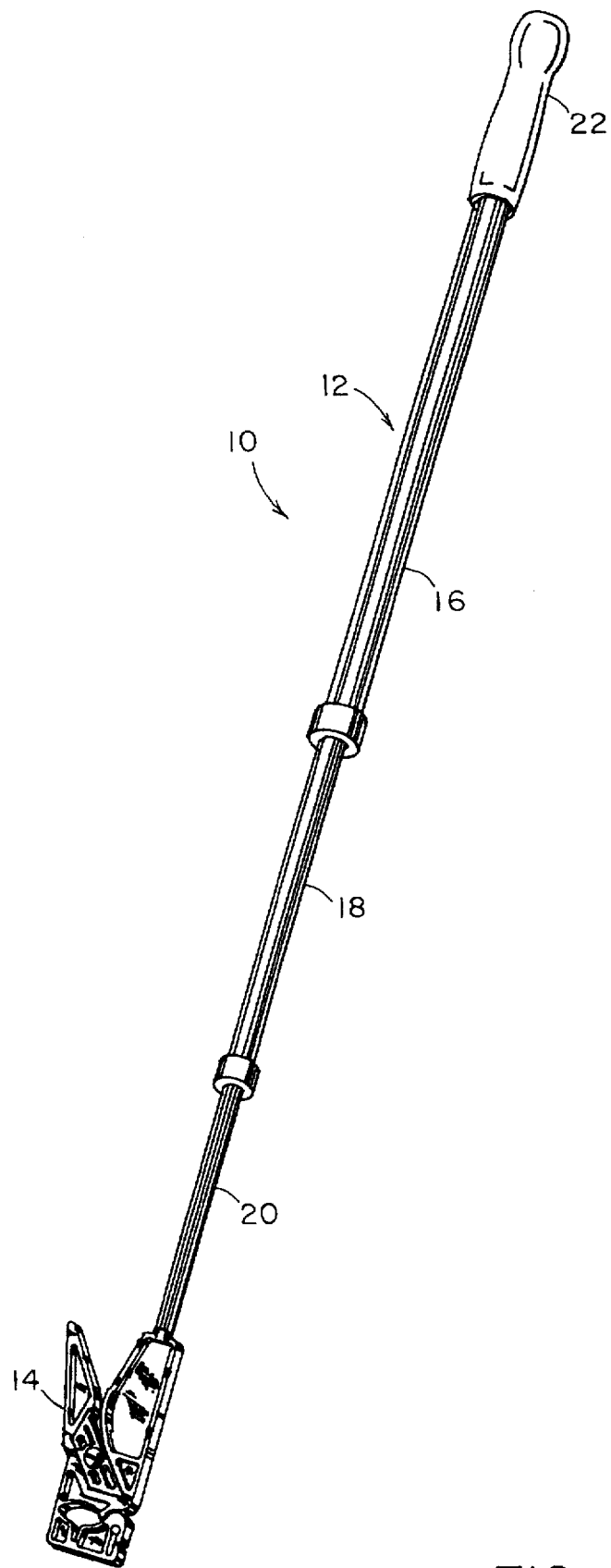
FIG. 4 is an isometric view of the overall fishing lure retrieval device of the invention shown with the telescopic handle in its extended position.

The second segment 30 likewise includes an inner arcuate sidewall 78 which is in opposed relationship to sidewall 70 and likewise terminates at apex 72. The segments 34, 36, and particularly the inner sidewalls 70, 78 thereof, cooperatively define the generally V-shaped concavity 32. At the same time, the sidewalls 70, 78 define a throat region 80 leading to the concavity 32. Referring to FIGS. 1 and 3, it will be seen that a metallic cutting blade 82 is removably mounted on the operating head 14, in an orientation such that the cutting edge 84 of blade 82 extends into concavity 32, i.e., the blade edge is oriented substantially parallel to the rectilinear surface of segment 30 between apex 72 and arcuate portion of sidewall 78. In this respect, the blade 82 is secured in place by means of nut and bolt assembly 86 which extends through appropriate aligned apertures 88, 90 provided through blade 82 and head 14.

The use of device 10 can best be understood through a consideration of FIGS. 7-9. FIG. 7 illustrates use thereof in unsnagging a relatively large lure 92 which is hooked to an underwater branch 94. In particular, the fisherman extends handle 12 and passes the supporting fishing line 96 through passageway 60 so that the line 96 passes through first opening 24. The fisherman then slides the operating head down the line 96 until the snagged lure 92 is encountered. At this point, the operating head 14 is manipulated so as to pass at least a portion of the lure 92 into and through the relatively large opening 24. The fisherman then manipulates the device 10 so as to twist and shift the lure 92 until it is free. Thereafter, the device 10 is taken off of the lure 92 and line 96, and the unsnagged lure can be reeled in by the fisherman.

FIG. 8 illustrates the operation of device 10 in unsnagging a small spinnerbait lure 98. In this instance, use is made of the relatively smaller opening 26. In particular, the fishing line 96 is passed through passageway 68 and into the confines of smaller opening 26, whereupon the operating head 14 is slid down the line 96 until it engages lure 98. The head 14 is then manipulated so as to firmly engage at least a portion of the lure 98, so that the latter may be shifted and twisted until unsnagged.

FIG. 9 depicts a typical use of device 10 in cutting fishing line. In this instance, a lure 100 supported by line 96 has ensnared submerged, spent fishing line 102. As the fisherman attempts to reel in the lure 100, the spent line 102 becomes taut as illustrated. The device 10 is then employed by passing the taut line 102 into and through throat region 80 and ultimately concavity 20. As the line 102 moves toward apex 74, it encounters the cutting edge 84 of blade 82 which rapidly severs the line 102. It will also be appreciated that the design of head 14 permits the cutting of other small objects such as brush, vines or the like which may impede retrieval of fishing lures.

I claim:

1. A fishing lure retrieval device comprising:
   a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening,
   said body further including a pair of adjacent, elongated, diverging segments cooperatively defining a concavity therebetween with cutting means mounted on one of said segments for severing of an object received in said concavity; and
   elongated handle means operatively coupled with said body for permitting manipulation of the body,
   each of said segments including an inner side wall surface in opposition to the side wall surface of the other segment, said segment side wall surfaces cooperatively defining a throat region leading to said concavity, said cutting means being secured to one of said segments and having a severing edge extending into said concavity.

2. The device of claim 1, said first opening being defined by arcuate inner walls presenting an enlarged primary section and a relatively small secondary section, said primary and secondary sections presenting respective longitudinal axes, the longitudinal axes of said primary and secondary sections being transverse to each other.

3. The device of claim 1, said second opening being defined by inner walls presenting an elongated section and a generally circular in cross-section, enlarged head section.

4. The device of claim 3, the length of said elongated section being at least about three times the width thereof.

5. The device of claim 1, said first and second openings being oriented in side-by-side relationship with each other, the passageways communicating with said first and second openings extending toward and through a common marginal sidewall of said body.

6. The device of claim 1, said concavity being generally V-shaped.

7. The device of claim 1, said handle means being secured to one of said segments at a point remote from said concavity.

8. The device of claim 1, said handle means comprising a series of telescopically interfitted, selectively extendable and retractable handle sections.

9. The device of claim 1, said body including an integral extension, said handle means comprising a tubular end telescoped over said extension and crimped thereto.

10. The device of claim 1, said body being formed of synthetic resin material.

11. The device of claim 1, said cutting means comprising a removable metallic cutting blade.

12. The device of claim 1, said first opening having an effective open area at least twice the effective open area of said second opening.

13. The device of claim 1, said body being integral and including central panel segments of a first thickness with marginal wall segments having a second thickness greater than said first thickness.

14. A fishing lure retrieval device comprising:

a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening, said body further including a pair of adjacent, elongated, diverging segments cooperatively defining a concavity therebetween with cutting means mounted on one of said segments for severing of an object received in said concavity; and elongated handle means operatively coupled with said body for permitting manipulation of the body, said second opening being defined by inner walls presenting an elongated section and a generally circular in cross-section, enlarged section.

15. The device of claim 14, the length of said elongated section being about three times the width thereof.

16. A fishing lure retrieval device comprising:

a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening, said body further including a pair of adjacent, elongated, diverging segments cooperatively defining a concavity therebetween with cutting means mounted on one of said segments for severing of an object received in said concavity; and elongated handle means operatively coupled with said body for permitting manipulation of the body, said handle means comprising a series of telescopically interfitted, selectively extendable and retractable handle sections.

17. A fishing lure retrieval device comprising:

a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening, said body further including a pair of adjacent, elongated, diverging segments cooperatively defining a concavity therebetween with cutting means mounted on one of said segments for severing of an object received in said concavity; and elongated handle means operatively coupled with said body for permitting manipulation of the body, said body including an integral extension, said handle means comprising a tubular end telescoped over said extension and crimped thereto.

18. A fishing lure retrieval device comprising:

a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening, said body further including a pair of adjacent, elongated, diverging segments cooperatively defining a concavity therebetween with cutting means mounted on one of said segments for severing of an object received in said concavity; and elongated handle means operatively coupled with said body for permitting manipulation of the body, said cutting means comprising a removable metallic clipping blade.

19. The device of claim 18, each of said segments including an inner sidewall surface in opposition to the sidewall surface of the other segment, said segment sidewall surfaces cooperatively defining a throat region leading to said concavity, said cutting means being, secured to one of said segments and having a severing edge extending into said concavity.

20. A fishing lure retrieval device comprising:

a body presenting marginal walls and separate, first and second lure-receiving openings therethrough with a pair of separate fishing line-clearing passageways each extending from a marginal wall of the body and communicating with a respective opening, said first opening having an effective open area substantially larger than the effective open area of said second opening, said body further including a pair of adjacent, elongated, diverging segments cooperatively defining a concavity therebetween with cutting means mounted on one of said segments for severing of an object received in said concavity; and elongated handle means operatively coupled with said body for permitting manipulation of the body, said body being integral and including central panel segments of a first thickness with marginal wall segments having a second thickness greater than said first thickness.

* * * * *